United States Patent
Dropps et al.

(10) Patent No.: US 8,924,764 B1
(45) Date of Patent: Dec. 30, 2014

(54) SYSTEMS AND METHODS FOR RATE MATCHING IN NETWORKS UTILIZING A STROBE COUNTER

(71) Applicant: QLOGIC, Corporation, Aliso Viejo, CA (US)

(72) Inventors: Frank R. Dropps, Maple Grove, MN (US); Ernest G. Kohlwey, Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 265 days.

(21) Appl. No.: 13/678,100

(22) Filed: Nov. 15, 2012

(51) Int. Cl.
*G06F 13/42* (2006.01)
*G06F 1/04* (2006.01)
*G06F 5/06* (2006.01)
*G06F 1/12* (2006.01)

(52) U.S. Cl.
CPC ........................................ *G06F 1/12* (2013.01)
USPC ............................ 713/400; 713/502; 713/600

(58) Field of Classification Search
USPC ......................................................... 713/400
See application file for complete search history.

(56) References Cited

U.S. PATENT DOCUMENTS

| | | | | |
|---|---|---|---|---|
| 5,502,752 A * | 3/1996 | Averbuch et al. | ............. | 375/377 |
| 6,084,934 A * | 7/2000 | Garcia et al. | .................. | 375/370 |
| 6,687,255 B1 * | 2/2004 | Holm et al. | .................... | 370/412 |
| 6,728,162 B2 * | 4/2004 | Lee et al. | ................... | 365/233.1 |
| 7,266,022 B2 * | 9/2007 | Aoki | ......................... | 365/189.05 |
| 7,613,887 B1 * | 11/2009 | Wong et al. | .................... | 711/154 |
| 8,311,761 B2 * | 11/2012 | Best | .............................. | 702/106 |

* cited by examiner

*Primary Examiner* — Suresh Suryawanshi
(74) *Attorney, Agent, or Firm* — Klein, O'Neill & Singh, LLP (57) ABSTRACT

Method and system for rate matching in networks is provided. The method includes setting a strobe counter of a network device equal to an initial value; and determining whether a current clock phase matches a clock phase during which a first sub-port from among a plurality of sub-ports is designated to read from a memory at a receive segment of the network device. When the current clock phase matches the designated clock phase for the first sub-port, determining if the strobe counter is equal to one of a plurality of mask values; and when the strobe counter is not equal to one of the mask values, reading data out of the memory.

20 Claims, 6 Drawing Sheets

SYSTEMS AND METHODS FOR RATE MATCHING IN NETWORKS UTILIZING A STROBE COUNTER

BACKGROUND

1. Technical Field

The present embodiments relate to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port network device where each port manages a point-to-point connection between itself and an attached system. Each port can be attached to a server, peripheral, input/output subsystem, bridge, hub, router, or another switch, where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine-implemented method for rate matching in networks is provided. The method includes setting a strobe counter of a network device equal to an initial value; wherein the network device includes a base-port coupled having a plurality of sub-ports configured to operate as independent ports for sending and receiving information using one of a plurality of network links at a plurality of rates and complying with a plurality of protocols; and determining whether a current clock phase matches a clock phase during which a first sub-port from among the plurality of sub-ports is designated to read from a memory at a receive segment of the network device. When the current clock phase matches the designated clock phase for the first sub-port, determining if the strobe counter is equal to one of a plurality of mask values; and when the strobe counter is not equal to one of the mask values, reading data out of the memory.

In another embodiment a network device with a port having a plurality of sub-ports configured to operate as independent ports for sending and receiving packets using one of a plurality of network links at a plurality of rates and complying with a plurality of protocols is provided. The port includes a physical coding sub-layer (PCS) including a PCS buffer, and a media access control (MAC) sub-layer shared by the plurality of sub-ports at a receive segment of the port, the PCS and the MAC being configured to process incoming data before it is sent to a storage location of the receive segment; and a strobe counter; wherein the strobe counter is configured to provide periodic interruptions to a data read out operation from the PCS buffer by asserting a valid signal for each clock cycle during which data should be read out, if it is available, and asserting an invalid signal for each clock cycle during which data should not be read out, even if it is available.

This brief summary has been provided so that the nature of the invention may be understood quickly. A more complete understanding of the present disclosure can be obtained by reference to the following detailed description of the preferred embodiments thereof concerning the attached drawing.

BRIEF DESCRIPTION OF THE DRAWINGS

The various present embodiments now will be discussed in detail with an emphasis on highlighting the advantageous features. These embodiments depict the novel and non-obvious systems and methods for rate matching in networks shown in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame includes source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

Figure 1:
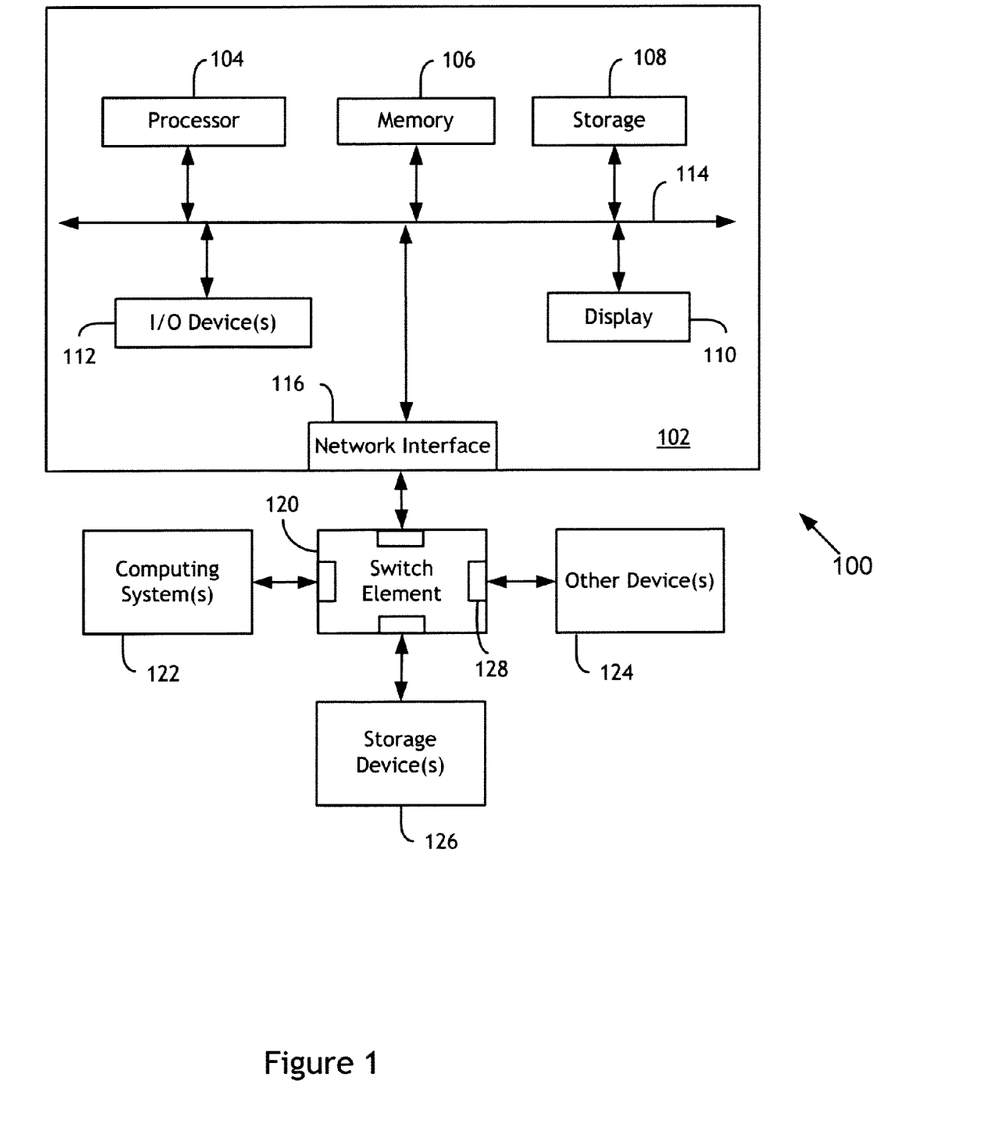
FIG. 1 is a functional block diagram of a network in connection with which the present embodiments may be used.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. the network interface 116 of host system 102 and an interface (not shown) for the storage devices 126. Fabric ports are typically located in Fabric devices, such as the switch element 120. Details regarding the switch 120 are provided below.

Figure 2A:
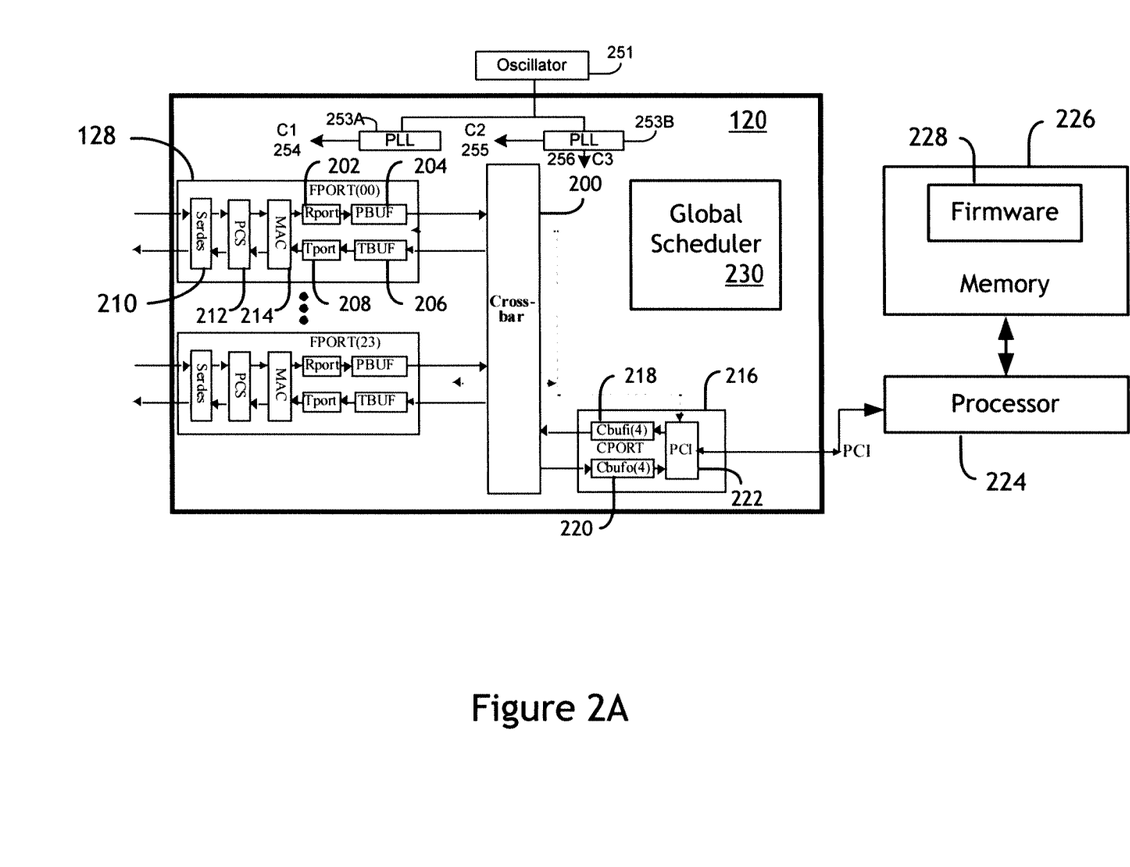
FIG. 2A is a functional block diagram of a switch element according to the present embodiments.

FIG. 2A is a high-level block diagram of the switch 120, also referred to as the switch element 120. Switch element 120 may be implemented as an application specific integrated circuit (ASIC) having a plurality of ports (may also be referred to as base-ports) 128. An external oscillator 251 may be used to power a plurality of phase locked loop (PLL) circuits 253A-253B to generate a plurality of clocks, C1 254, C2 255 and C3 256. As an example, C1 254 may be 425 MHz when a port is configured to operate as a Fibre Channel port, C2 255 may be 312 Mhz when a port is configured to operate as an Ethernet port, and C3 256 may be a system clock of 825 MHz. The embodiments disclosed herein are not limited to any particular clock rate.

The ports 128 are generic (GL) and may include an N_Port, F_Port, FL_Port, E_Port, or any other port type. The ports 128 may be configured to operate as Fibre Channel, FCoE or Ethernet ports. In other words, depending upon what it is attached to, each GL port can function as any type of port. As an example, the ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a switch crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared pipeline for receiving frames (or information). The pipeline includes a serializer/deserializer (SERDES) 210, a physical coding sub-layer (PCS) 212, and a media access control (MAC) sub-layer 214. The SERDES 210 receives incoming serial data and converts it to parallel data. The parallel data is then sent to the PCS 212 and the MAC 214 for processing before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) via the crossbar 200 and a transmit buffer (TBUF) 206. The TBUF 206 is a temporary memory storage device where frames or information related to frames are staged before being transmitted.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 to the processor 224.

Port 128 described above may be referred to as a "base port" that may have more than one network link available for receiving and transmitting information. Each network link allows the base port to be configured into a plurality of independently operating sub-ports, each uniquely identified for receiving and sending frames. The sub-port configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
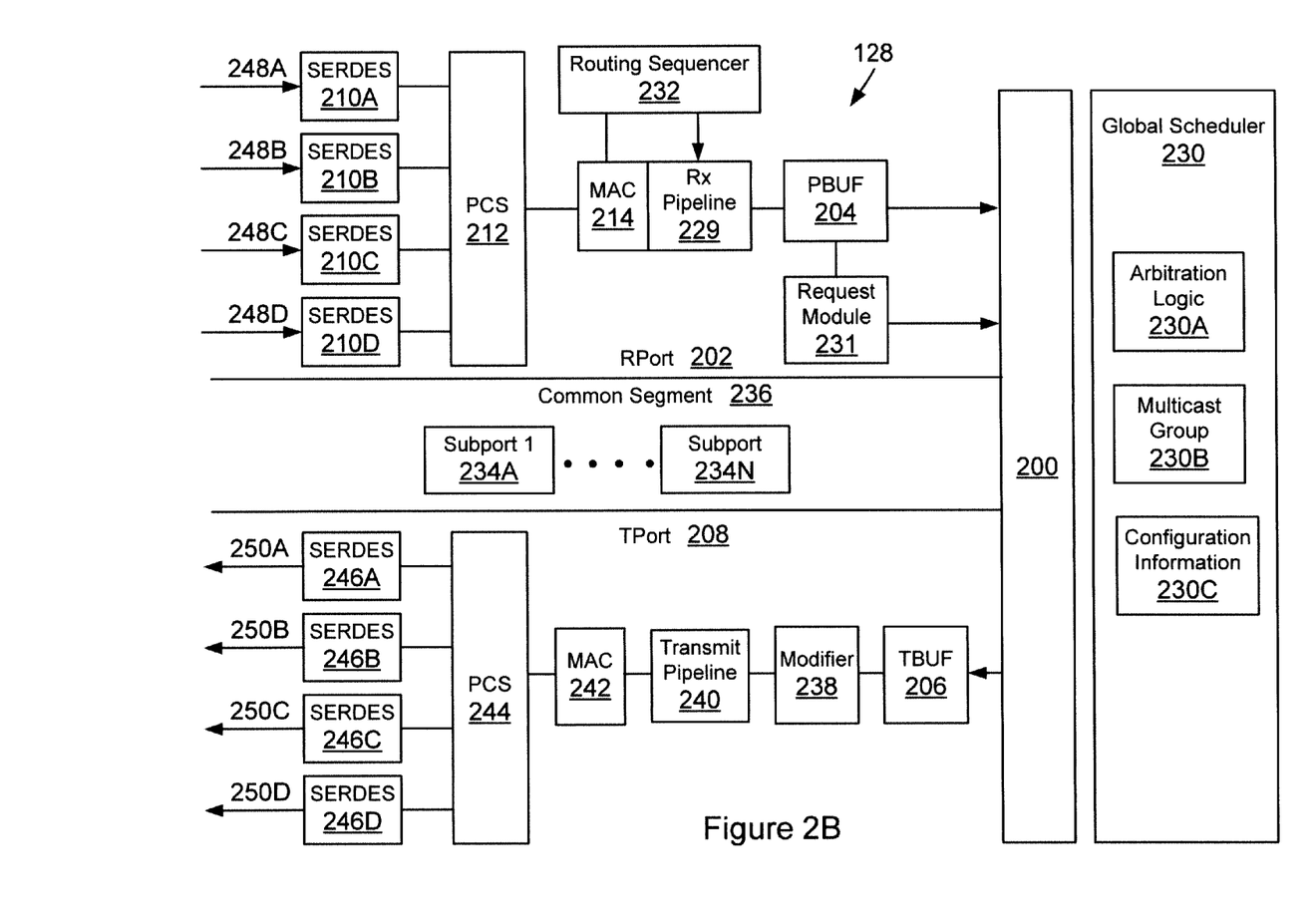
FIG. 2B is a block diagram of a base-port of a switch element, according to one embodiment

FIG. 2B shows an example of base port 128 having RPORT 202. TPORT 208, and a common segment 236, according to one embodiment. RPORT 202 is used for receiving and processing frames, while TPORT 208 is used for transmitting frames. Common segment 236 is used to store configuration and status information that may be commonly used among different components of base port 128.

In one embodiment, base port 128 may be configured to include a plurality of sub-ports. The configuration, status, and statistics information/logic 234A-234N for each sub-port may be stored in common segment 236. The configuration logic 234A-234N may include look up tables or other data structures for storing configuration information.

RPORT 202 may include or be coupled to a plurality of network links, for example, four independent physical network links (or lanes) 248A-248D, each configured to operate as a portion of an independent sub-port within base port 128. Each network link is coupled to a SERDES 210A-210D, all of which share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 may be a part of the receive pipeline 229.

Incoming frames are received via one of the network links 248A-248D. A received frame is processed by the appropriate SERDES and then sent to the PCS 212. After PCS 212 processes the frame, the frame is provided to MAC 212 that is time-shared among a plurality of sub-ports. Thus, for a certain time segment (for example, a clock cycle). MAC 214 may be used by one of the sub-ports. After the MAC 212 processes the frame it is sent to receive pipeline 229 that is also time-shared.

Information regarding the frame or a copy of the frame is also provided to a routing sequencer (or module) 232 that determines a destination for the received frame. In one embodiment, a frame whose destination is processor 224 is given the highest priority, followed by a frame that is routed by a ternary content addressable memory (TCAM) or steering registers located within the routing sequencer 232. More than one routing sequencer 232 may be used for each base port 128. Frames that are ready to be sent out are staged at PBUF 204. PBUF 204 may have a plurality of queues (or slots) that may be referred to as receive queues. The receive queues temporarily store frames, until a request to move each frame is granted.

To move frames from the receive queues, a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 includes arbitration logic 230A that performs dual stage arbitration for requests from various base ports. Scheduler 230 also maintains a data structure at a memory labeled as multicast group 230B. The data structure stores information for identifying multicast groups that may receive multicast frames, e.g. frames that are destined to multiple destinations. Scheduler 230 stores configuration information 230C for various ports and some of that information may be used to select requests.

Frames for transmission via TPORT 208 move via TBUF 206 and a modifier 238. In one embodiment, modifier 238 may be used to insert or remove information from an outgoing frame. The modification may be based on the frame type. The time-shared transmit pipeline 240 and MAC 242 are used to process outgoing frames. MAC 242 may be a part of transmit pipeline 240. PCS 244, SERDES 246A-246D are used similarly to PCS 212 and SERDES 210A-210D. Network links 250A-250D are similar to links 248A-248D, except links 250A-250D are used to transmit frames. Furthermore, although separate MAC and PCS are shown for the transmit segment, the same PCS 212 and MAC 214 of the receive segment may be used in the transmit segment.

Figure 3A:
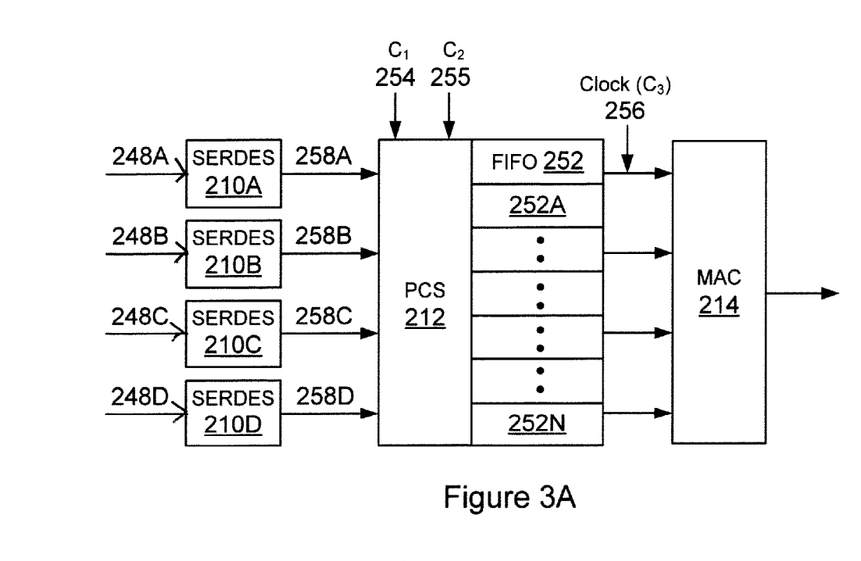
FIGS. 3A-3B show portions of a receive pipeline and a transmit pipeline of a base-port, according to one embodiment.

FIG. 3A illustrates an example of receiving frames 258A-258D at PCS 212 from SERDES 210A-210D. The frames may be received at different clock rates based on the configuration of network links 248A-248D and the associated sub-ports. As an example, frames (or data) may be received at PCS 212 and stored at C1 254 and/or C2 255, and then read out of PCS 212 at clock C3 256. Clock C3 may also be referred to as system clock. PCS 212 includes a memory storage device (shown as a first-in-first out (FIFO) type device) 252 (referred to as rate matching FIFO) having a plurality of storage locations 252A-252N. The storage locations are used to stage frames or portions of a frame before the frames are read out at C3 256. The storage locations 252A-252N may be used to prevent overrun or underrun conditions, as described below in detail.

Figure 3B:
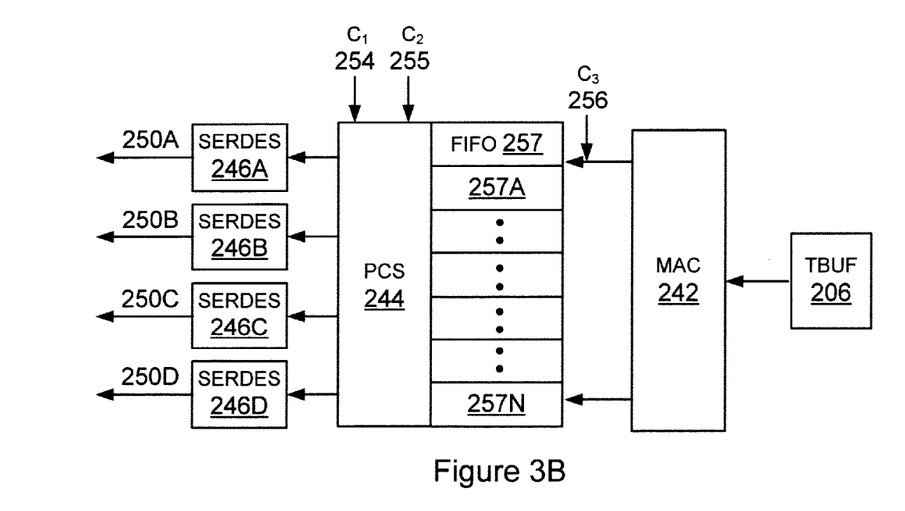

In the transmit path, as shown in FIG. 3B, frames are received at FIFO 257 via TBUF 206 and shared MAC 214. In the transmit path, frames are written to FIFO 257 using the system clock 256 and then read out either at a clock rate of C1 254 or C2 255 to match the sub-port link rate. A read control logic (not shown) is used to read data from TBUF 206 to avoid any errors due to a mismatch between the system clock and the clock at which data is read out for transmission from PCS 244.

Figure 4:
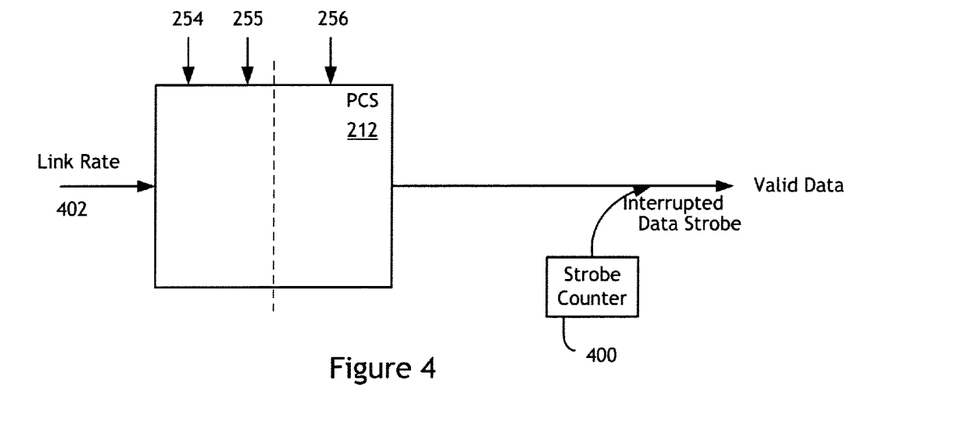
FIG. 4 is a functional block diagram of the physical coding sub-layer (PCS) used in a base-port, according to one embodiment.

FIG. 4 shows a block diagram using a strobe counter 400 that generates a valid value for reducing error due to a mismatch between clocks C1, C2, C3, according to one embodiment. The strobe counter 400 provides periodic interruptions to the data read out operation from FIFO 252. For example, since the link rate 402 for a network link (for example, 248A) is known, it is possible to match that rate by reading out data on average X times for every Y cycles of the system clock C2 256, where X<Y.

To achieve the matching, strobe counter asserts a valid signal for each clock cycle during which data should be read out, if it is available. Periodically, strobe counter 400 asserts an invalid signal for each clock cycle during which data should not be read out, even if it is available. Over time, the rate at which data is read out of the PCS 212 matches the rate at which data is written in. In certain embodiments, the distribution of invalid signals in the read operation is substantially uniform in order to avoid errors, as discussed below.

Figure 5A:
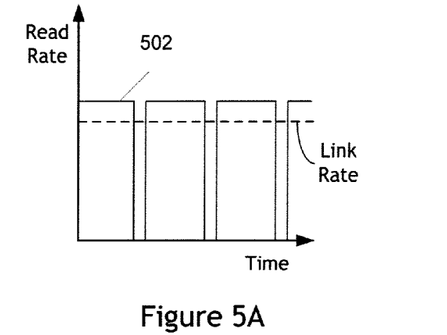
FIG. 5A is a graph plotting read rate versus time for frames that are received by a base-port, according to one embodiment.

FIG. 5A is a graph plotting read rate versus time when the read rate is higher than the link rate 402, such as in certain of the present embodiments. The square curve 502 represents the rate at which data is read out of the PCS 212, while the horizontal dashed line represents the link rate 402, or the rate at which incoming data is written to the PCS 212. Because the read rate is higher than the link rate, the read operation is periodically interrupted in order to avoid an underrun condition. An underrun condition occurs when data is read out too fast, causing the buffer to run out of data, which can cause packets to become corrupted. Thus, the horizontal portions of the read rate curve that are located above the link rate line represent intervals when data is being read out of the PCS 212 if it is available, e.g. intervals when the strobe counter 400 is asserting a valid signal. The portions of the read rate curve that are located on the x-axis represent periodic interruptions in reading data, e.g. intervals when the strobe counter 400 is asserting an invalid signal such that data is not being read out of the PCS 212 even if it is available. Ideally, the area under the read rate curve is equal to the area under the link rate line, which indicates that over time the average read rate equals the link rate.

Figure 5B:
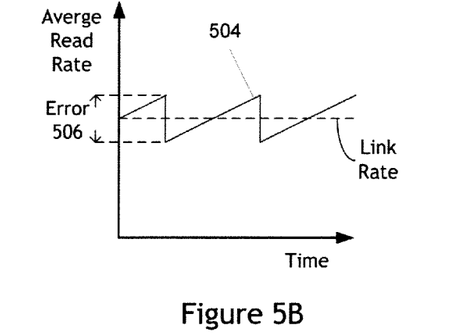
FIG. 5B is a graph plotting read rate error versus time for frames that are received by a base-port, according to one embodiment.

FIG. 5B is a graph plotting average read rate versus time for the system of FIG. 5A. The saw-tooth curve 504 represents the average read rate over time. As discussed above, the read operation is periodically interrupted so that under-runs may be avoided. Thus, as reads are occurring, the average read rate rises, but the average read rate drops steeply each time the read operation is interrupted, hence the saw-tooth curve 504 shown in FIG. 5B.

The vertical band labeled "Error" 506 in FIG. 5B represents upper and lower boundaries of the average read rate for the system. If the average read rate rises above the vertical band, an error (underrun) occurs because data is being read out of the PCS 212 faster than it is being written in. If the average read rate falls below the vertical band, an error (overrun) occurs because data is being read out of the PCS 212 slower than it is being written in. Preferably, the clock cycles during which the strobe counter 400 asserts an invalid signal are evenly distributed across the read operation, which results in the repeating saw-tooth 504 curve shown in FIG. 5B. The clock cycles during which the strobe counter 400 asserts an invalid signal are represented by the vertical portions of the saw-tooth curve 504, while the diagonal portions of the saw-tooth curve represent the clock cycles during which the strobe counter 400 asserts a valid signal. Evenly distributing the clock cycles during which the strobe counter 400 asserts an invalid signal avoids errors because the average read rate is not allowed to ever climb above or drop below the vertical band labeled "Error" in FIG. 5B. In some embodiments, the clock cycles during which the strobe counter 400 asserts an invalid signal may not be evenly distributed. However, preferably they are distributed to avoid large contiguous strings of either valid signals or invalid signals over time.

The foregoing discussion has focused on only a single direction of data movement, data incoming to the port 128. The same aspects can be applied to outgoing data. Or, in certain embodiments rate matching for outgoing data can be controlled by the TBUF 206.

The rate matching of the present embodiments may be configured to be compatible with a time multiplexed environment. As discussed above, each base-port 128 is divided into sub-ports (not shown). Each of the sub-ports move data during only certain phases of each clock cycle, such as only during one phase of each cycle. Thus, whether or not a given sub-port can input or output data at any given time is determined by whether its designated clock phase for moving data matches the current clock phase, as discussed below with respect to FIG. 6. The current clock phase may be determined by a counter that continuously cycles through X phases, such as by repeatedly counting 0, 1, 2, 3, 0, 1, 2, 3, 0, 1, 2, 3 . . . , for example. If a given sub-port is designated to move data only during phase 2, then it can move data only when the counter is equal to 2. The phase counter could be located in CPORT 216 or almost anywhere on the switch element 120 and distributed globally to all of the base-ports. Alternatively, phase counters could reside in multiple places, such as one in each base-port, as long as they are synchronized with each other.

Figure 6:
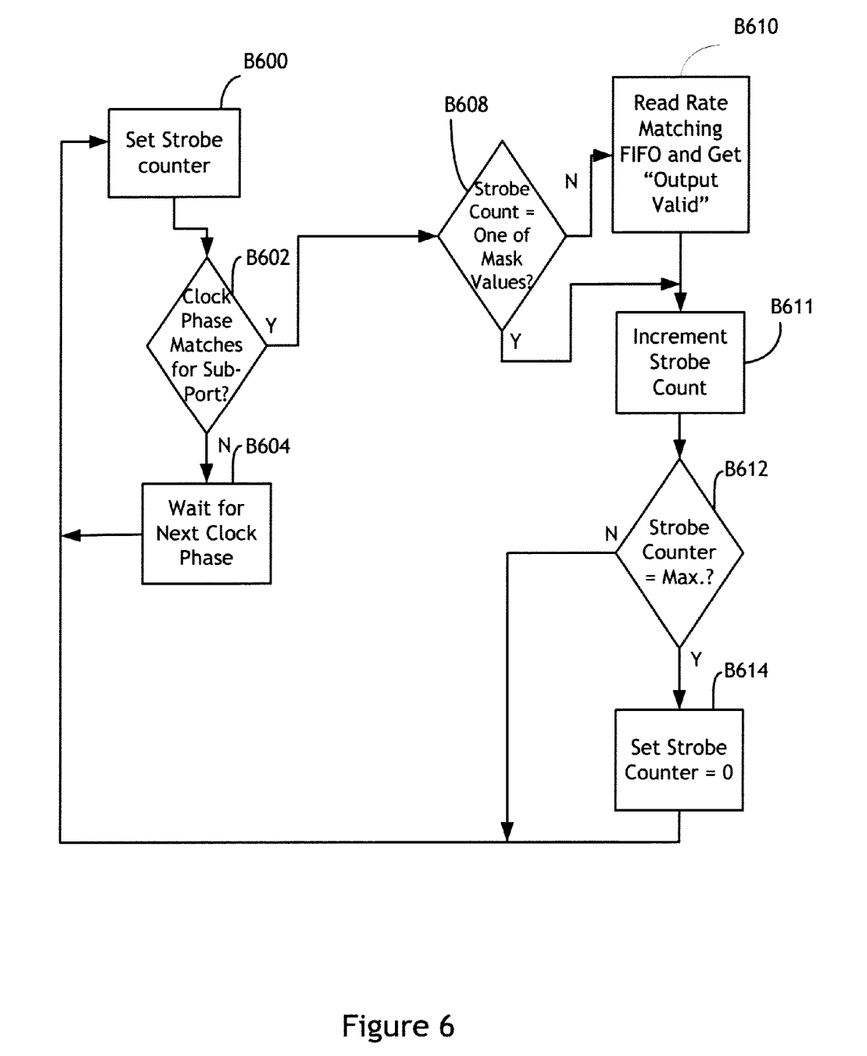
FIG. 6 is a flowchart illustrating one of the present embodiments of methods for rate matching in network devices.

FIG. 6 is a flowchart illustrating one of the present embodiments of methods for rate matching in networks. The process begins in block B600 when the strobe counter is set equal to an initial value, such as zero, and the process advances to block B602. In block B602, the process determines whether a current clock phase matches the phase during which a given sub-port is designated to read from the PCS 212. As described above, the PCS 212 is a shared resource and each sub-port is given access to read out data from the PCS 212 during a certain phase. If a current phase does not match the sub-port for which there may be data stored at PCS 212, then the sub-port simply waits for the next clock cycle at block B604 and then loops back to block B602.

However, if there is a match at block B604, then the process then advances to block B608, where the process determines if the strobe counter 400 is equal to one of the mask values. The mask values are strobe count values when the data valid is driven inactive and data is not read from the PCS. In other words, the mask values are the strobe count values when the read rate shown in FIG. 5A is on the x-axis. If the masked values do not match the strobe count value, then the process advances to block B610, when data is read out of PCS FIFO 252. The strobe counter 400 generates a valid signal. e.g. a bit value indicating that the data that is read is valid. The process then advances to block B611. The process also moves to block B611, if there is a match in block B608.

In block B611, the strobe counter 400 is incremented (or increased). The process then advances to block B612, where it is determined whether the strobe counter 400 has reached its maximum value. As discussed above, the strobe counter 400 repeatedly counts from a first value to a second value, such as from zero to three. When the counter reaches three, it resets to zero. Thus, if the answer at block B612 is yes, then the process advances to block B614 where the counter value is reset to a value of zero. The process then loops back to block B602. However, if the answer at block B612 is no, then the process skips block B614 and loops back to block B602.

In one embodiment, a network device is provided that includes base-ports coupled to a plurality of links. The base-ports can be configured to operate as multiple, independent sub-ports for sending and receiving data complying with different protocols and link rates. Since different link rates use different clock speeds, a rate matching FIFO is provided can accommodate the difference in link rates while still using shared logic. The shared logic makes the overall design of the network device efficient because multiple rates/protocols/sub-ports share the same logic for handling frames.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications d alternate constructions from that discussed above that are fully equivalent. For example, the embodiment disclosed herein can be used in an adapter or other similar devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method for rate matching in networks, the method comprising:
setting a strobe counter of a network device equal to an initial value; wherein the network device includes a base-port having a plurality of sub-ports configured to operate as independent ports for sending and receiving information using one of a plurality of network links at a plurality of rates and complying with a plurality of protocols;
determining whether a current clock phase matches a clock phase during which a first sub-port from among the plurality of sub-ports is designated to read from a memory at a receive segment of the network device;
when the current clock phase matches the designated clock phase for the first sub-port, determining if the strobe counter is equal to one of a plurality of mask values; and
when the strobe counter is not equal to one of the mask values, reading data out of the memory.

2. The method of claim 1, further comprising the strobe counter generating a valid signal indicating that the data that is read is valid.

3. The method of claim 1, further comprising incrementing the strobe counter after the data is read.

4. The method of claim 3, further comprising determining whether the strobe counter has reached its maximum value.

5. The method of claim 4, wherein when the strobe counter has reached its maximum value, resetting the strobe counter value to the initial value.

6. The method of claim 1, wherein when the current clock phase does not match the designated clock phase for the first sub-port, waiting for a next clock cycle.

7. The method of claim 1, wherein the strobe counter provides periodic interruptions to a data read out operation from the memory by asserting a valid signal for each clock cycle during which data should be read out, if it is available, and asserting an invalid signal for each clock cycle during which data should not be read out, even if it is available.

8. The method of claim 1, wherein the initial value is zero.

9. The method of claim 1, wherein the memory is a shared resource and each of the sub-ports is given access to read out data from the memory during a designated clock phase.

10. The method of claim 1, wherein the mask values are strobe count values when a data valid is driven inactive and data is not read from the memory.

11. The method of claim 1, wherein the network device is a switch coupled to one or more devices.

12. The method of claim 1, wherein one of the plurality of sub-ports is configured to operate as a Fibre Channel port.

13. The method of claim 1, wherein one of the plurality of sub-ports is configured to operate as an Ethernet port or a Fibre Channel over Ethernet port.

14. A network device, comprising:
a port having a plurality of sub-ports configured to operate as independent ports for sending and receiving packets using one of a plurality of network links at a plurality of rates and complying with a plurality of protocols, the port comprising
a physical coding sub-layer (PCS) including a PCS buffer, and a media access control (MAC) sub-layer shared by the plurality of sub-ports at a receive segment of the port, the PCS and the MAC being configured to process incoming data before it is sent to a storage location of the receive segment; and
a strobe counter;
wherein the strobe counter is configured to provide periodic interruptions to a data read out operation from the PCS buffer by asserting a valid signal for each clock cycle during which data should be read out, if it is available, and asserting an invalid signal for each clock cycle during which data should not be read out, even if it is available.

15. The network device of claim 14, wherein the strobe counter is configured to assert the valid signal when it is not equal to one of a plurality of mask values, and assert the invalid signal when it is equal to one of the mask values.

16. The network device of claim 15, wherein the mask values are strobe count values when a data valid is driven inactive and data is not read from the memory.

17. The network device of claim 14, wherein the port further comprises a serializer/deserializer (SERDES) for converting incoming serial data to parallel data, and for converting outgoing parallel data to serial data.

18. The network device of claim 14, wherein the network device is a switch coupled to one or more devices.

19. The network device of claim 14, wherein one of the plurality of sub-ports is configured to operate as a Fibre Channel port.

20. The network device of claim 14, wherein one of the plurality of sub-ports is configured to operate as an Ethernet port or a Fibre Channel over Ethernet port.

* * * * *

UNITED STATES PATENT AND TRADEMARK OFFICE
CERTIFICATE OF CORRECTION

PATENT NO.       : 8,924,764 B1
APPLICATION NO.  : 13/678100
DATED            : December 30, 2014
INVENTOR(S)      : Dropps et al.

Page 1 of 1

It is certified that error appears in the above-identified patent and that said Letters Patent is hereby corrected as shown below:

In the Drawings:

In Sheet 5 of 6 (Figure 5B), line 1, delete "Averge" and insert -- Average --, therefor.

In the Specification:

In column 2, line 28, delete "embodiment" and insert -- embodiment; --, therefor.

In column 10, line 7, delete "signal." and insert -- signal, --, therefor.

Signed and Sealed this
Fourth Day of August, 2015

Michelle K. Lee
*Director of the United States Patent and Trademark Office*